UNITED STATES PATENT OFFICE.

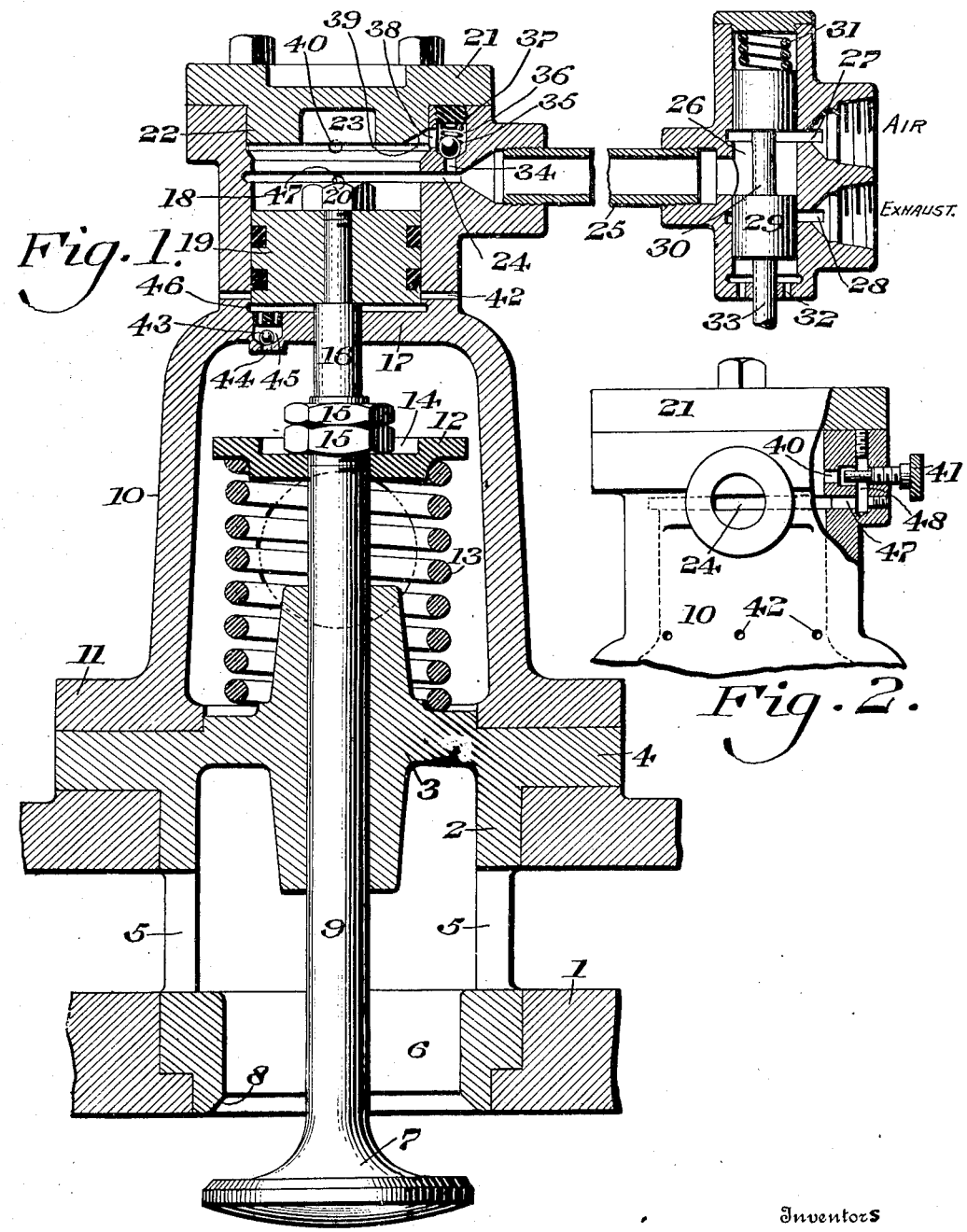

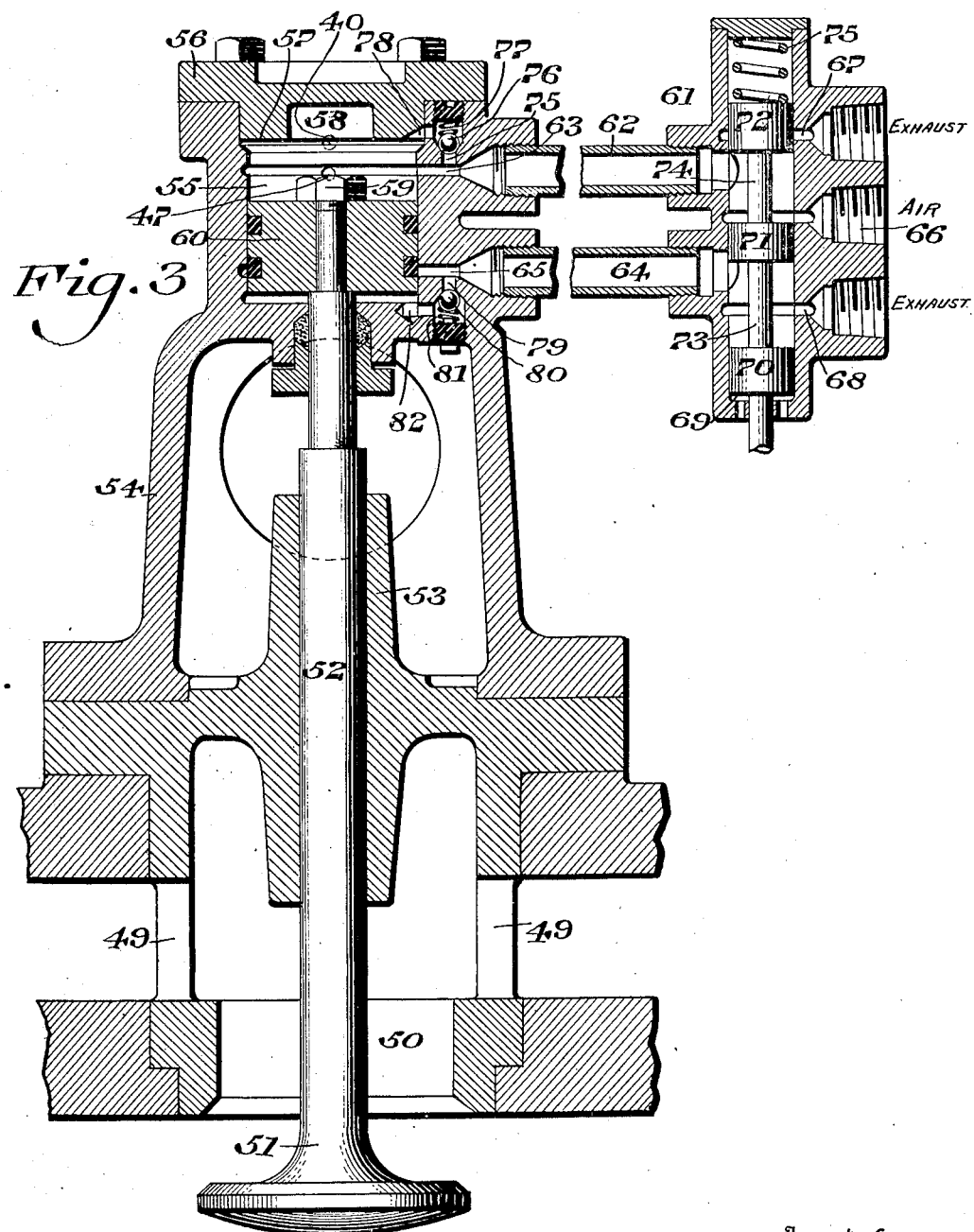

WILLIAM B. ENGLER AND CONSTANT J. KRYZANOWSKY, OF LANSING, MICHIGAN.

VALVE FOR GAS-ENGINES.

No. 885,459.

Specification of Letters Patent.

Patented April 21, 1908.

Application filed May 22, 1907. Serial No. 375,184.

*To all whom it may concern:*

Be it known that we, WILLIAM B. ENGLER, a citizen of the United States, residing in the city of Lansing, county of Ingham, State of Michigan, and CONSTANT J. KRYZANOWSKY, a citizen of the United States, residing in the city of Lansing, county of Ingham, State of Michigan, have invented a new and useful Valve for Gas-Engines, of which the following is a specification.

One of the main objects of our present invention is to devise a novel construction of a valve and valve operating mechanism in which all of the heavy stresses due to operating the valves are confined to very narrow limits within the bonnet of the valve, whereby we are enabled to eliminate wholly or in part, the heavy gearing which has heretofore been deemed indispensable in valves of this character.

A further object of our invention is to devise a novel construction of a piston valve, the pistons of which are controlled by light and freely moving operating valves, whereby material and space is economized and the main valve is rendered more sensitive and more readily governed.

To the above ends, our invention consists of a novel construction of valve mechanism in which a valve, of any desired type, is provided with a piston which is yieldingly actuated in both directions preferably by fluid pressure.

Our invention further consists of a novel construction of a bonnet having a piston chamber therein, in which the piston of the valve is movable, suitable ports and passages being provided communicating with the piston chamber and with a suitable fluid pressure supply, whereby the movement of the piston and thereby the valve connected therewith may be accurately controlled at all times and under all working conditions which arise.

It further consists of the combination of a valve connected to and operated by a piston mounted in a working cylinder, which latter is provided with a cushioning chamber at each end in order to prevent the slamming of the valve in opening or closing.

It further consists of other novel features of construction, all as will be hereinafter fully set forth.

For the purpose of illustrating our invention, we have shown in the accompanying drawings those embodiments which best illustrate the principles thereof and which have been found in practice to give satisfactory and reliable results, although it is to be understood that the various instrumentalities of which our invention consists can be variously arranged and organized and that our invention is not limited to the precise arrangement and organization of these instrumentalities as herein shown.

Figure 1 represents a sectional elevation of a valve mechanism embodying our invention. Fig. 2 represents a side elevation of a portion of the bonnet, certain parts being broken away to more clearly show ports and passages not seen in Fig. 1. Fig. 3 represents a sectional elevation of another embodiment of our invention in which the piston is moved in both directions by fluid pressure.

Similar numerals of reference indicate corresponding parts in the figures.

Referring to the drawings:—In the present case for the purpose of illustration, we have preferred to show an ordinary puppet valve, although it is to be understood that the type of valve employed may vary according to the conditions and requirements of the case.

Referring first to Figs. 1 and 2, 1 designates a casing having an inlet and outlet and into which the flange 2 of the spider 3 extends, said spider 3 having a flange 4 extending therefrom which is adapted to be seated on the upper portion of the casing 1, said flange being provided with apertures 5 therethrough which register with the inlet and outlet of the casing, whereby the liquid or fluid may pass through the opening 6 when the valve 7 is open as indicated in Fig. 1, said valve 7 being suitably beveled or otherwise adapted to coact with the seat 8 carried, in the present instance, by the flange 2.

9 designates the valve stem which is movably mounted in the spider 3 and extends within the bonnet 10, which latter is provided with a flange 11 adapted to be seated on the flange 4 of the spider 3, whereby the parts may be secured together by means of any suitable fastening devices such as bolts and nuts.

12 designates a ring or collar having preferably threaded engagement with the valve stem 9 between which and the body of the spider 3 is interposed a suitable spring 13. The collar 12 is recessed as indicated at 14 and is maintained in its adjusted position by means of the locking nuts 15. The end of the stem 9 has a reduced diameter as indicated at 16 which extends through the wall or partition 17 of the bonnet 10 and into the piston chamber 18, the end of said valve stem 9 having secured thereto in any suitable manner, a piston 19 which may be provided with suitable packing if desired. In the present instance, we have shown the end of the stem 9 as having a reduced diameter which extends through the piston 19 and which is provided with a suitable nut 20 whereby the piston and valve stem are rigidly secured together. The end of the piston chamber 18 is closed by means of the cap or closure 21 which is secured thereto in any suitable manner and in the present instance is provided with a depending flange 22 which is apertured at 23 in order to permit a greater relative movement of the piston 19 and nut 20.

24 designates the inlet and exhaust passage from the rear of the piston, said passage communicating by means of a conduit 25 with a valve chamber 26 of the controlling valve into which a port 27 opens, said port communicating with a suitable fluid pressure supply. The chamber 26 is provided with an exhaust port 28, which together with the port 24 is controlled by a valve 29 which comprises in the present instance, two heads of uniform diameter joined by a neck 30.

31 designates a spring intermediate the end of the valve and one end of the piston chamber 26. Exhaust ports 32 are provided which lead from one end of the valve chamber 26 to the atmosphere.

The valve stem 33 may be operated by any suitable mechanism or arrangement such as a cam or eccentric geared to the main shaft of the engine or by an electric solenoid or other means best suited to the particular engine on which it is used, and since the same is old in the art and forms *per se* no part of our present invention, we have deemed it unnecessary to show the means for controlling the valve 29.

When it is desired to open the valve 7, the valve 29 is moved by any suitable means into the position seen in Fig. 1 whereupon fluid pressure may enter the inlet, pass through the conduit 25 and inlet port 24 and assuming that the valve is closed, the piston 19 will close the inlet port 24 so that fluid pressure will pass through the port 34, raising the ball 35 located in the chamber 36 against the tension of its spring 37 and fluid pressure may pass through the port 38, and groove 39, into the piston chamber 18, it being noted that the port 40 is controlled by means of an adjustable screw 41, the end of which is adapted to entirely close said port 40, if desired.

As soon as the piston 19 passes beyond the port 24, it will be apparent that said piston is subjected to the full pressure of the motive fluid. The pressure in front of the piston escapes through the ports 42 which it will be noticed are located in rear of the forward end of the piston chamber 18 whereby after the piston passes said ports, the air between the piston and the wall 17 will form a cushion for the forward stroke of the piston. We also provide a check valve comprising a ball 43 which is adapted to control the opening 44 which communicates with the internal chamber of the bonnet 10, the chamber 45 in which said valve is seated having the passages 46 communicating therewith and with the piston chamber 18. As soon as the valve 29 is actuated in a reverse direction, the inlet port 27 will be closed and the exhaust port 28 will be opened, whereby the fluid pressure in the rear of the piston 19 will pass through the inlet 24, conduit 25, around the groove 30 of the piston and thence through exhaust port 28.

It will be seen that as the piston moves rearwardly, the fluid will follow the line of least resistance which will be through the port 24 until after the piston has closed said port 24, when further escape of the fluid must be through port 40, the area of which is adjusted by the valve 41. It will thus be understood that the ports 40 and 47 are employed to form a passage connecting the extreme upper portion of the piston chamber with the annular groove 24 and thereby with the conduit 25. It will thus be seen that the port 40 constitutes an outlet passage for the air entrapped by the piston 19, after it has passed the groove 24 on its rearward movement, it being obvious that if desired the passage of the air through the port 40 may be restricted or entirely closed by means of the adjustable valve 41.

In the embodiment shown in Fig. 3, we have shown the valve as being adapted to be actuated in both directions by fluid pressure and in this embodiment we have shown a similar valve to that seen in Fig. 3. 49 designates ports which communicate with the valve controlled passage 50 which is closed by the valve 51, the stem 52 of which is mounted in the spider 53, said stem extending into the bonnet 54 which is adapted to be secured with respect to the spider 53 and the main conduit in any suitable manner. The bonnet 54 is provided with a piston chamber 55 which is closed by means of a cap 56 having a depending flange 57 provided with a chamber 58 into which the nut 59, by means of which the piston 60 is secured to the end of the valve stem 52, is adapted to pass during the operation. 61 designates the casing of the controlling valve from which leads the conduit 62 communicating by means of an inlet port 63 with the piston chamber 55 and also communicating by means of a conduit 64 with a port 65 which opens into the piston chamber 55. 66 designates the inlet for the fluid pressure and 67 and 68 designate exhaust ports. The valve 69 is provided with three heads, 70, 71 and 72 of uniform diameter and the necks 73 and 74. In this embodiment, in which we have shown a double acting piston, the fluid enters through the port 66 and assuming that the parts of the valve are in the position shown, the fluid pressure passes around the neck 74, through the conduit 62, inlet port 63 and assuming that the piston 60 is at the rear end of its stroke, the fluid pressure will pass through the port 75, raising the ball 76 against the tension of the spring 77 and passing through the port 78 in rear of the piston 60 will cause said piston to move forwardly into the position seen in Fig. 3, and the exhaust in front of the piston takes place through the port 65, conduit 64, around the groove 73 and through exhaust port 68, thereby causing the valve to open.

When it is desired to close the valve, the valve 69 is actuated, so that the head 71 passes beyond the inlet port 66 whereby fluid pressure may pass through said inlet 66 around the groove 73, through conduit 64 in the passage 65 and assuming that the piston is in the position shown, the inlet port 65 being closed by the piston 60, the fluid pressure will pass through the port 79, raising the ball 80 against the tension of the spring 81 and passing through port 82 beneath the piston will cause said piston to be moved rearwardly and the exhaust from the rear of the piston taking place through port 63, conduit 62, around the groove 74 of the valve 69 and through exhaust port 67, it being noted that as soon as the piston closes the port 63, the fluid pressure in rear of the piston at this time will be trapped, since the ball 76 will close the port 75 and the rear stroke of the piston will be properly cushioned, as is evident.

It will, of course, be understood that when the piston is moving forwardly to open the valve that after the same has passed the inlet port 65, the fluid pressure between the lower end of the piston and the inner end of the piston chamber 55 will be trapped therein, since the ball 80 will close the inlet port 79, as will be apparent to those skilled in this art. It will thus be apparent that our invention in its broad scope comprises a novel construction of a valve mechanism in connection with which a single or double acting working cylinder may be employed in which means are also employed for cushioning the piston at each end of its stroke.

In the present instance, we have preferred to show the inlet port 24 as opening into an annular groove communicating with the piston chamber 18 and in Fig. 3, we have shown the inlet port 63 as opening into an annular groove communicating with the piston chamber 55, but it is, of course, to be understood that these grooves may be omitted if desired and still be within the scope of our invention, although we have found it advantageous in practice to employ a construction such as is shown in the drawings.

It will now be apparent from the foregoing that we have devised a novel and useful construction of valve and valve operating mechanism which embodies the features of advantage enumerated as desirable in the statement of invention and the above description and while we have, in the present instance, preferred to show those embodiments thereof which have been found in practice to give satisfactory and reliable results, it is to be understood that they are susceptible of modification in various particulars without departing from the spirit and scope of the invention or sacrificing any of its advantages.

It is further to be understood that we do not intend to limit the fluid pressure on the upper surface of the piston at the beginning of the stroke. The velocity of the piston 19 being low at starting due to the inertia of the valve, piston and other adjuncts, sufficient fluid will pass through the port 34 to maintain substantially the full fluid pressure, it being understood that the port 40 may, if desired, be nearly or completely closed by the valve 41. The check valves, such as 35 or 76, prevent the air which is being compressed in the rear of the piston from escaping but on the forward stroke these check valves permit the fluid to freely pass to the upper portion of the piston chamber, as will be apparent to those skilled in this art.

Having thus described our invention, what we claim as new and desire to secure by Letters Patent, is:—

1. In a device of the character described, the combination with a valve having a stem therefor, of a bonnet having a piston chamber into which said valve stem extends, an unapertured piston carried by said stem, valve controlled means for admitting fluid pressure to advance said piston including a passage leading to the rear of said chamber and provided with an inwardly opening check valve, means for returning said piston, and means for cushioning the piston at each end of its stroke.

2. In a device of the character described, the combination of a valve having a stem, a spider in which said stem is mounted, a bonnet having a piston chamber into which said stem extends, a piston carried by said stem, valve controlled means for admitting fluid pressure to move said piston in one direction, a check valve controlling the initial admission of fluid pressure to advance said piston and located in said bonnet, means for returning said piston, and means for cushioning said piston at each end of its stroke.

3. In a device of the character described, the combination with a valve having a stem, of a spider in which said stem is mounted, a bonnet through which said stem extends and provided with a piston chamber, a piston in said chamber and secured to said stem, ports and passages for the fluid pressure leading to said chamber, means for leading live motive fluid to either end of said chamber, one of said passages being automatically controlled and means for cushioning the piston at each end of its stroke.

4. In a device of the character described, the combination with a bonnet having a piston chamber therein, of a valve stem extending into said chamber, a piston secured to said stem, said chamber having passages leading thereto through the side wall near each end which serve alternately as inlet and exhaust, passages leading through said first passages and opening into the piston chamber at each end in rear of the piston, and a check valve in each of said passages.

5. In a device of the character described, the combination with a valve bonnet having a valve stem extending thereinto, of a piston secured to said stem, a combined inlet and exhaust port opening into said chamber through the side wall thereof near each end, a passage leading from each of said first named passages and opening into the piston chamber at each end thereof, a check valve in each of said passages, and valve controlled means for regulating the inlet and exhaust of motive fluid through said first named passages.

6. In a device of the character described, the combination of a valve casing, a spider, a valve having a stem guided in said spider, and a bonnet having a piston chamber into which said stem extends, a piston in said chamber secured to said stem, a passage opening into the side wall of said chamber near each end thereof adapted to serve alternately for inlet and exhaust, valve controlled means communicating with each of said passages and said piston chamber at each end, and an independent valve for controlling the inlet and exhaust of motive fluid to said side passages.

7. In a device of the character described, the combination with a bonnet having a piston chamber therein, of a valve stem extending into said chamber, a piston secured to said stem, a passage opening into said piston chamber through the side wall thereof at a suitable distance from each end, a passage leading from each of said passages and opening into said piston chamber at each end thereof, an inwardly opening check valve in each of said passages, and valve mechanism for controlling the inlet and exhaust of motive fluid to and from said side passages.

8. In a device of the character described, the combination with a valve bonnet having a piston chamber therein, of a valve stem extending into said bonnet, a piston secured to said stem, an annular groove in the side wall of said chamber near the end thereof, a passage for motive fluid leading to each of said grooves, a passage leading from said side inlet passages and opening into said chamber at each end thereof, an inwardly opening check valve in each of said passages, and a valve controlling admission and exhaust of motive fluid to said inlet passages.

9. In a device of the character described, the combination with a bonnet having a piston chamber therein, of a valve stem extending into said chamber, a piston secured to said stem, an exhaust port through the side wall of said chamber near one end thereof, an inlet port through the side wall of said chamber near the other end thereof, a passage leading from said side inlet passage and opening into the piston chamber at the rear end thereof, an inwardly opening check valve in said passage, and means for controlling admission and exhaust of motive fluid to and from said inlet port.

WILLIAM B. ENGLER.
CONSTANT J. KRYZANOWSKY.

Witnesses:
MAX W. MUELLER,
ARTHUR A. DOBSON.